United States Patent
Nakada et al.

(10) Patent No.: US 10,222,806 B2
(45) Date of Patent: Mar. 5, 2019

(54) VEHICLE DRIVE CONTROL DEVICE

(71) Applicant: HONDA MOTOR CO., LTD., Tokyo (JP)

(72) Inventors: Yuki Nakada, Wako (JP); Hiroyuki Koibuchi, Wako (JP); Daisuke Kondo, Wako (JP); Yosuke Sakamoto, Wako (JP); Yoshifumi Banno, Wako (JP); Yuki Kizumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/437,768

(22) Filed: Feb. 21, 2017

(65) Prior Publication Data

US 2017/0242440 A1  Aug. 24, 2017

(30) Foreign Application Priority Data

Feb. 22, 2016 (JP) ................. 2016-030996

(51) Int. Cl.
*G05D 1/02* (2006.01)
*B62D 15/02* (2006.01)
*B62D 3/12* (2006.01)
*B62D 6/00* (2006.01)

(52) U.S. Cl.
CPC ............. *G05D 1/0246* (2013.01); *B62D 3/12* (2013.01); *B62D 6/001* (2013.01); *B62D 15/025* (2013.01)

(58) Field of Classification Search
CPC ........ G05D 1/0246; B62D 2/12; B60W 30/12
See application file for complete search history.

(56) References Cited

U.S. PATENT DOCUMENTS

| | | | |
|---|---|---|---|
| 4,565,257 A * | 1/1986 | Hanson | E02F 9/0841 180/419 |
| 5,485,892 A * | 1/1996 | Fujita | B60K 28/066 180/167 |
| 6,895,318 B1 * | 5/2005 | Barton | B60T 8/1755 180/204 |
| 8,543,261 B2 * | 9/2013 | Anderson | B60W 30/09 701/3 |
| 8,849,515 B2 * | 9/2014 | Moshchuk | B62D 15/0265 340/435 |
| 9,090,279 B2 * | 7/2015 | Buerkle | B60W 50/0098 |
| 9,182,761 B2 * | 11/2015 | Fujita | B60W 30/09 |
| 9,731,755 B1 * | 8/2017 | Moshchuk | B62D 1/28 |
| 2002/0063015 A1 * | 5/2002 | Sugitani | B62D 1/12 180/444 |

(Continued)

FOREIGN PATENT DOCUMENTS

JP  11-147473 A  6/1999

*Primary Examiner* — Alex C Dunn
(74) *Attorney, Agent, or Firm* — Westerman, Hattori, Daniels & Adrian, LLP

(57) ABSTRACT

A vehicle drive control device includes a drive lane detector, a drive assist unit, and a curve road steering assist unit. The drive lane detector detects a drive lane of a subject vehicle. The drive assist unit performs drive assist control to assist the subject vehicle in lane keep driving in the drive lane. The curve road steering assist unit performs steering assist for assisting the subject vehicle in turning along a curve of a curve road if the drive lane is the curve road and if the drive assist control performed by the drive assist unit is discontinued during driving on the curve road.

7 Claims, 6 Drawing Sheets

(56) References Cited

U.S. PATENT DOCUMENTS

2006/0235598 A1* 10/2006 Kudo ................... B62D 15/026
 701/96
2016/0167702 A1* 6/2016 Morimoto ............ B62D 15/025
 701/41

* cited by examiner

VEHICLE DRIVE CONTROL DEVICE

CROSS REFERENCES TO RELATED APPLICATIONS

The present application claims priority under 35 U.S.C. § 119 to Japanese Patent Application No. 2016-030996, filed Feb. 22, 2016, entitled "Vehicle Drive Control Device." The contents of this application are incorporated herein by reference in their entirety.

TECHNICAL FIELD

The present disclosure relates to a vehicle drive control device that performs drive assist control to assist a vehicle in lane keep driving in a drive lane.

BACKGROUND

Japanese Unexamined Patent Application Publication No. 11-147473 describes a steering effort support device that can reduce the steering effort for a driver in a curve road and accurately instruct a driver to perform a steering operation along a curve road by applying a suitable steering effort control torque in response to a steering effort support request ([0009], Abstract).

In this steering effort support device (Abstract), a curvature calculator 4A calculates the curvature ρ of a drive lane ahead of a vehicle 1, and a vehicle velocity detector 32 detects a velocity V of the vehicle 1. A control torque calculator 5 calculates steering effort control torque Tg based on the curvature ρ of the drive lane calculated by the curvature calculator 4A and the velocity V of the vehicle 1 detected by the vehicle velocity detector 32. A controller 6 controls a steering actuator 21 so that the steering effort control torque Tg calculated by the control torque calculator 5 will be generated in a direction to assist the vehicle 1 in turning along the curve.

In calculating the steering effort control torque Tg, the lateral acceleration G is also calculated based on the curvature ρ of the drive lane and the velocity V of the vehicle 1 ([0048], FIGS. 6 and 7). Additionally, considering a case in which a drive lane is not recognized based on image information, a lateral acceleration sensor may also be used for detecting the lateral acceleration ([0053]).

SUMMARY

The above-described publication discloses a technology focusing on the use of the steering effort control torque Tg for assisting a vehicle in driving in a curve road, but does not examine the use of the steering effort control torque Tg with another type of torque.

The present application describes, for example, a vehicle drive control device that can increase the application range of steering assist torque for assisting a vehicle in driving in a curve road.

A vehicle drive control device according to an aspect of the present disclosure includes a drive lane detector, a drive assist unit, and a curve road steering assist unit. The drive lane detector detects a drive lane of a subject vehicle. The drive assist unit performs drive assist control to assist the subject vehicle in keeping driving in the drive lane. The curve road steering assist unit performs steering assist for assisting the subject vehicle in turning along a curve of a curve road if the drive lane is the curve road and if the drive assist control performed by the drive assist unit is discontinued.

If drive assist control for assisting the subject vehicle in keeping driving in a drive lane is discontinued, the curve road steering assist unit performs steering assist for assisting the vehicle in turning along a curve of the curve road. Even after drive assist control is discontinued, the steering angle suitable for driving in the curve road is likely to be maintained, thereby improving the drive assist performance in the curve road. Hence, steering assist for assisting the vehicle in turning along the curve road can be performed in combination with drive assist control.

The drive lane detector may include an imaging unit that obtains a front image indicating a front area of the subject vehicle and a lane detector that detects the drive lane from the front image. The drive assist unit may include a lane keep assist unit that calculates a first steering assist amount for assisting the subject vehicle in keeping driving in the drive lane detected by the lane detector so as to perform lane keep control as steering assist based on the first steering assist amount. The curve road steering assist unit may calculate a second steering assist amount which increases in accordance with an increase in a lateral acceleration of the subject vehicle so as to perform steering assist based on the second steering assist amount. The vehicle drive control device may further include a decrease limiter that limits a decrease in a corrected steering assist amount based on the first steering assist amount or a decrease in the first steering assist amount until the corrected steering assist amount or the first steering assist amount coincides with the second steering assist amount when the lane detector becomes unable to detect the drive lane to a degree enough to perform the drive assist control by the drive assist unit.

When the vehicle enters a curve road, the lane detector may not be able to detect the drive lane to a degree enough to perform drive assist control by the drive assist unit. In this case, lane keep control is discontinued. To avoid sudden switching from lane keep control to steering assist, instead of immediately setting the corrected steering assist amount or the first steering assist amount to zero, a decrease in the corrected steering assist amount or the first steering assist amount is limited (in other words, a decrease in the corrected steering assist amount or the first steering assist amount is gradually reduced) until the corrected steering assist amount or the first steering assist amount coincides with the second steering assist amount. Additionally, when switching to steering assist based on the lateral acceleration, the corrected steering assist amount or the first steering assist amount is not suddenly changed. This allows the driver to feel less uncomfortable in response to steering assist.

When the decrease limiter limits a decrease in the corrected steering assist amount or a decrease in the first steering assist amount as a result of the lane detector becoming unable to detect the drive lane to a degree enough to perform the drive assist control by the drive assist unit, the decrease limiter may reduce a decrease in the corrected steering assist amount or a decrease in the first steering assist amount per unit time to be smaller as the lateral acceleration is greater. Before the lane detector becomes unable to detect the drive lane to a degree enough to perform drive assist control by the drive assist unit from the front image due to the curving of a curve road, it is highly likely that the lane detector has been able to detect the drive lane from the front image (the vehicle has been driving in a gentler curve road). In other words, it is highly likely that the vehicle is driving in a curve road when the corrected steering assist amount or the first steering assist amount is gradually decreased as a result of the lane detector failing to detect the drive lane from the front image. In this case, if the lateral acceleration is greater, a decrease in the corrected steering assist amount or the first steering assist amount per unit time is set to be smaller. As a result, the drive assist performance in a sharp curve road is more likely to be maintained.

According to an aspect of the disclosure, it is possible to increase the application range of steering assist torque for assisting a vehicle in driving in a curve road.

BRIEF DESCRIPTION OF THE DRAWINGS

The advantages of the disclosure will become apparent in the following description taken in conjunction with the following drawings.

DETAILED DESCRIPTION

A. Embodiment

A-1. Description of Overall Configuration
[A-1-1. Overall Configuration of Vehicle 10]

Figure 1:
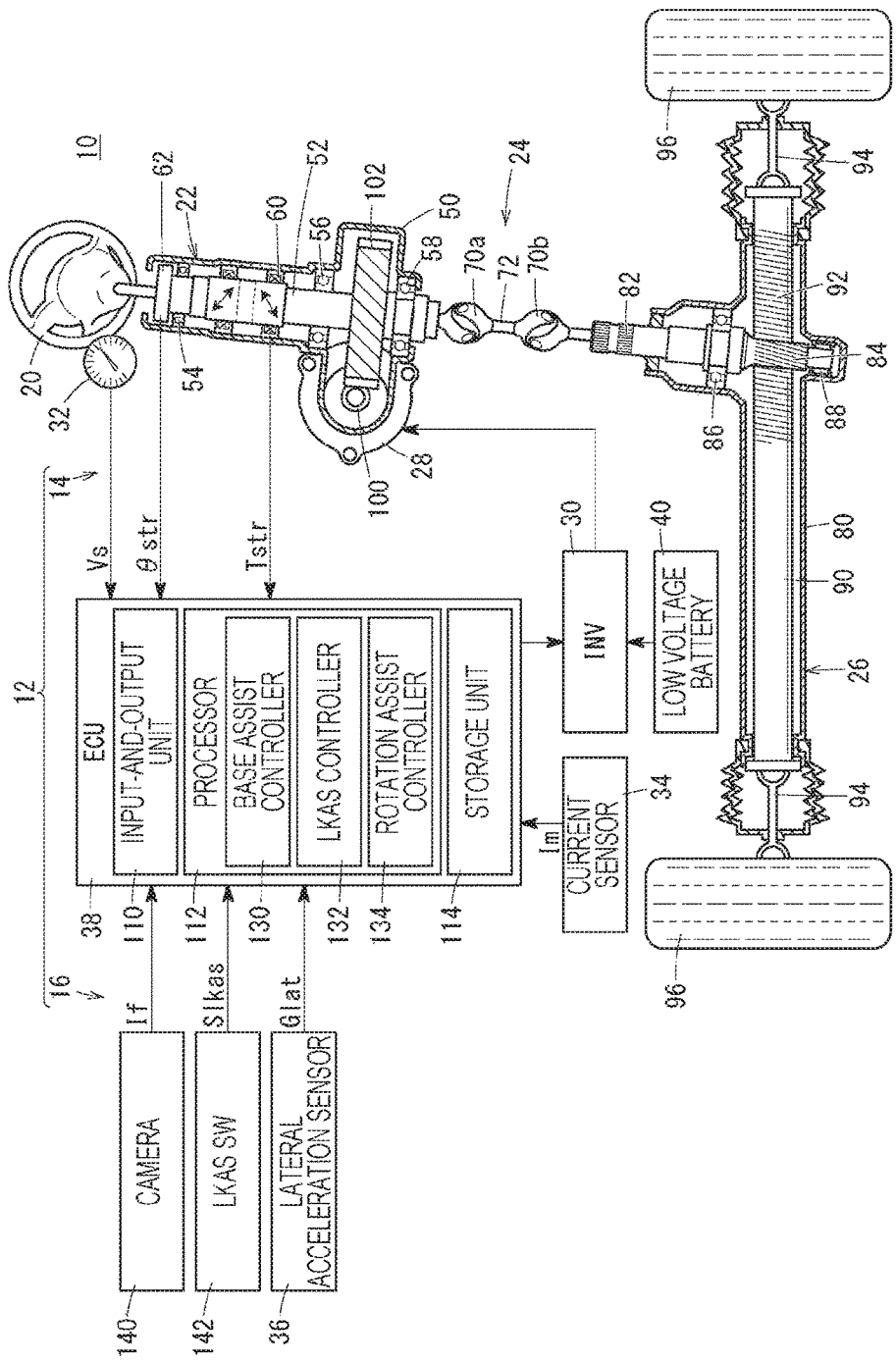
FIG. 1 is a schematic view of a vehicle including a steering device having an electronic control unit (ECU) which serves as a vehicle drive control device according to an embodiment.

FIG. 1 is a schematic view of a vehicle 10 including a steering device 12 having an electronic control unit 38 (hereinafter called "ECU 38") which serves as a vehicle drive control device according to an embodiment. The steering device 12 serves as an electric power steering device 14 (hereinafter called "EPS device 14") and a lane keep assist system 16 (hereinafter called "LKAS 16").
[A-1-2. EPS Device 14]
(A-1-2-1. Overview of EPS Device 14)

In addition to the ECU 38, the EPS device 14 of the steering device 12 includes a steering wheel 20, a steering column 22, an intermediate joint 24, a steering gear box 26, a drive motor 28 for the EPS device 14 (hereinafter also called "EPS motor 28"), an inverter 30 (hereinafter also called "EPS inverter 30"), a vehicle velocity sensor 32, a current sensor 34, a lateral acceleration sensor 36, and a low voltage battery 40 (hereinafter also called "battery 40").

The steering column 22 includes a housing 50, a steering shaft 52 supported by bearings 54, 56, and 58 within the housing 50, a torque sensor 60, and a steering angle sensor 62.

The intermediate joint 24 includes two universal joints 70a and 70b and a shaft 72 disposed therebetween.

The steering gear box 26 includes a housing 80, a pinion shaft 82, a rack shaft 90, and tie rods 94. The pinion shaft 82 is provided with a pinion 84 of a rack-and-pinion mechanism and is supported by bearings 86 and 88. The rack shaft 90 is provided with rack teeth 92 of the rack-and-pinion mechanism.
(A-1-2-2. Manual Steering System)

One end of the steering shaft 52 is fixed to the steering wheel 20, and the other end thereof is interconnected to the universal joint 70a. The universal joint 70a interconnects the other end of the steering shaft 52 and one end of the shaft 72. The universal joint 70b interconnects the other end of the shaft 72 and one end of the pinion shaft 82. The pinion 84 of the pinion shaft 82 meshes with the rack teeth 92 of the rack shaft 90 which can reciprocate in the width direction of the vehicle 10. Ends of the rack shaft 90 are interconnected to right and left front wheels 96 via the tie rods 94.

As a result of a driver operating the steering wheel 20, steering torque Tstr (rotational force) is generated and is transmitted to the pinion shaft 82 via the steering shaft 52 and the intermediate joint 24. Then, as a result of the pinion 84 of the pinion shaft 82 meshing with the rack teeth 92 of the rack shaft 90, the steering torque Tstr is converted into thrust, thereby displacing the rack shaft 90 in the width direction of the vehicle 10. In accordance with the displacement of the rack shaft 90, the tie rods 94 rotate the front wheels 96 to change the direction of the vehicle 10.

The steering shaft 52, the intermediate joint 24, the pinion shaft 82, the rack shaft 90, and the tie rods 94 form a manual steering system that directly transmits thrust converted from the steering torque Tstr generated as a result of the driver operating the steering wheel 20 to the front wheels 96.
(A-1-2-3. Steering Assist System)
(A-1-2-3-1. Assist Drive System)

The EPS motor 28 is interconnected to the steering shaft 52 via a worm gear 100 and a worm wheel gear 102. That is, the output shaft of the EPS motor 28 is interconnected to the worm gear 100. The worm wheel gear 102 which meshes with the worm gear 100 is integrally or elastically formed in the steering shaft 52.

In this embodiment, the EPS motor 28 is a three-phase alternating current (AC) brushless motor. The EPS motor 28 may be another type of motor, such as a three-phase AC brush, single-phase AC, or direct current (DC) motor. The EPS motor 28 receives power from the low voltage battery 40 via the EPS inverter 30 which is controlled by the ECU 38, and generates drive torque Tm (hereinafter also called "motor torque Tm" or "torque Tm") in accordance with the magnitude of power. The motor torque Tm (or thrust based on the motor torque Tm) is transmitted to the rack shaft 90 via the output shaft of the EPS motor 28, the worm gear 100, the steering shaft 52 (worm wheel gear 102), the intermediate joint 24, and the pinion shaft 82. The EPS motor 28, the worm gear 100, and the steering shaft 52 (worm wheel gear 102) form an assist drive system that generates a steering drive force (motor torque Tm).

In this embodiment, the torque Tm is used as steering assist torque Tasi. The steering assist torque Tasi includes base assist torque Tb, LKAS torque Tlkas, and rotation assist torque Tra.

Figure 2:
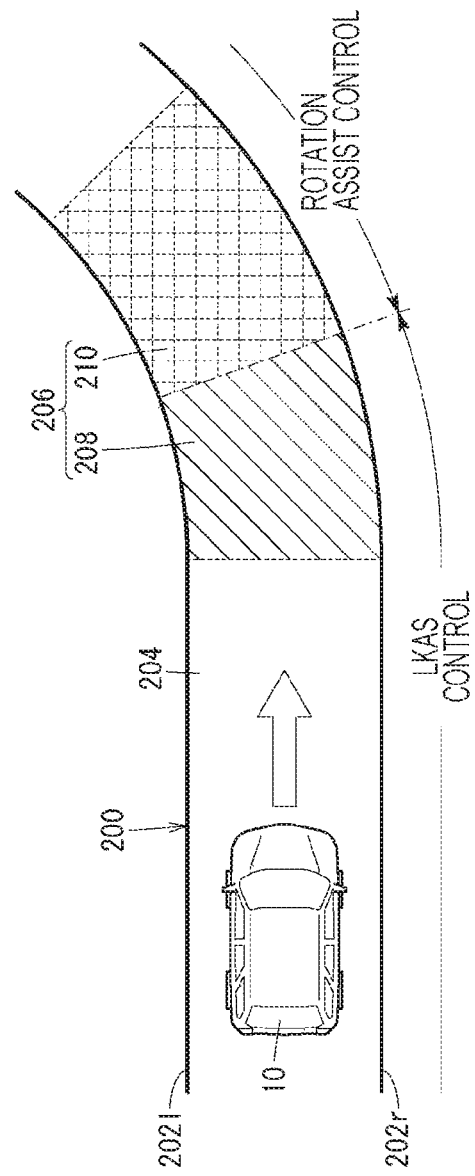
FIG. 2 illustrates an example of a state in which the vehicle is driving in a drive lane in the embodiment.

The base assist torque Tb is a drive force acting in the same direction as the input torque (steering torque Tstr) applied to the steering wheel 20 by the driver so as to assist the driver in steering. The LKAS torque Tlkas is torque for assisting the vehicle 10 in keep driving in a drive lane 200 (FIG. 2). The rotation assist torque Tra is torque for assisting the vehicle 10 in rotating. The steering assist torque Tasi may act in a direction opposite to the steering torque Tstr, which will be discussed later.

(A-1-2-3-2. Assist Control System)

The EPS inverter 30, the vehicle velocity sensor 32, the current sensor 34, the lateral acceleration sensor 36, the ECU 38, the torque sensor 60, and the steering angle sensor 62 form an assist control system that controls the assist drive system. Hereinafter, the assist drive system, the assist control system, and the low voltage battery 40 may collectively be called a steering assist system. In this embodiment, output from the EPS motor 28 is controlled under vector control using the d axis and the q axis.

(a) Feedforward Sensors

The torque sensor 60 detects the steering torque Tstr applied to the steering shaft 52 and outputs the steering torque Tstr to the ECU 38. The vehicle velocity sensor 32 detects the vehicle velocity Vs [km/h] and outputs the vehicle velocity to the ECU 38. The lateral acceleration sensor 36 detects the lateral acceleration Glat generated in the vehicle 10 and outputs the lateral acceleration Glat to the ECU 38. The steering angle sensor 62 detects the steering angle θstr (steering angle value θstr) [degrees] indicating the steering amount of the steering wheel 20 and outputs the steering angle θstr to the ECU 38. The steering torque Tstr, the vehicle velocity Vs, the lateral acceleration Glat, and the steering angle θstr are used for feedforward control performed by the ECU 38.

(b) EPS Inverter 30

The EPS inverter 30 is a three-phase bridge inverter that performs DC-AC conversion. The EPS inverter 30 converts a DC from the low voltage battery 40 into a three-phase AC and supplies it to the EPS motor 28.

(c) Feedback Sensors

The current sensor 34 detects a q-axis current (hereinafter called "motor current Im"), which is a torque current component in the above-described vector control. In this embodiment, when the EPS motor 28 is driven in a first direction (which causes the vehicle 10 to turn in the right direction, for example), the motor current Im is set to be a positive value. When the EPS motor 28 is driven in a second direction (which causes the vehicle 10 to turn in the left direction, for example), the motor current Im is set to be a negative value. However, if it is possible to determine the first direction and the second direction, the motor current Im may take only positive values.

The current sensor 34 includes a current sensor unit (not shown), a resolver (not shown), and a q-axis current calculator. The current sensor unit detects currents of at least two of the U-, V-, and W-phase windings (not shown) of the EPS motor 28. The resolver detects the electrical angle θ, which is the rotating angle of the output shaft (not shown) or an outer rotor of the EPS motor 28. The q-axis current calculator calculates the q-axis current (motor current Im), based on the currents of at least two of the U-, V-, W-phase windings detected by the current sensor unit and the electrical angle θ detected by the resolver. The function of the q-axis current calculator may be implemented by the ECU 38.

(d) ECU 38

As shown in FIG. 1, the ECU 38 includes an input-and-output unit 110, a processor 112, and a storage unit 114 as the hardware configuration. The ECU 38 controls output from the EPS motor 28 by using the EPS inverter 30, based on the output values from the individual sensors. The input-and-output unit 110 performs input and output between the ECU 38 and an external device (such as the vehicle velocity sensor 32 and the steering angle sensor 62).

The processor 112 includes a central processing unit (CPU), and controls the steering device 12 (EPS device 14 and LKAS 16) by using programs and data stored in the storage unit 114. The processor 112 includes a base assist controller 130, a LKAS controller 132, and a rotation assist controller 134. The base assist controller 130, the LKAS controller 132, and the rotation assist controller 134 form part of the EPS device 14. The LKAS controller 132 forms part of the LKAS 16. Details of the ECU 38 will be discussed later with reference to FIG. 5.

The storage unit 114 includes a volatile memory and a non-volatile memory, and stores various programs and data used by the processor 112.

(A-1-2-3-3. Low Voltage Battery 40)

The low voltage battery 40 is an energy storage device that is capable of outputting a low voltage (12 V in this embodiment), and may be a secondary cell such as a lead-acid battery.

[A-1-3. LKAS 16]

The LKAS 16 of the steering device 12 includes a front camera 140 (hereinafter also called "camera 140") and a LKAS switch 142, in addition to the EPS motor 28 and the ECU 38.

The camera 140 is attached to the inner side of a front windshield in front of a rear-view mirror. When the LKAS switch 142 is ON, the camera 140 captures an image of a left-side lane mark 202*l* and a right-side lane mark 202*r* at both sides of a road surface (drive lane 200 (FIG. 2)) ahead of the vehicle 10. The LKAS switch 142 switches between ON and OFF of the LKAS 16 in response to a user operation.

The ECU 38 (in particular, the LKAS controller 132) performs LKAS control (lane keep control). The ECU 38 detects the left-side lane mark 202*l* and the right-side lane mark 202*r* (white lines or boundary lines) (FIG. 2) at both sides of the vehicle 10 from a front image If captured by the camera 140. Then, the ECU 38 controls the EPS motor 28 so that the vehicle 10 can drive at the center between the left-side lane mark 202*l* and the right-side lane mark 202*r*. In this embodiment, LKAS control is performed when the velocity Vs is, for example, 65 to 100 [km/h].

A-2. Output Control for EPS Motor 28

[A-2-1. Overview]

FIG. 2 illustrates an example of a state in which the vehicle 10 is driving in the drive lane 200. The drive lane 200 is defined by the left-side lane mark 202*l* and the right-side lane mark 202*r*. Hereinafter, the left-side lane mark 202*l* and the right-side lane mark 202*r* may collectively be called "lane marks 202". Although a single lane is shown in FIG. 2, the output control may be applicable to multiple lanes.

In the drive lane 200 shown in FIG. 2, a curve road 206 is positioned after a straight road 204. In the curve road 206, a first region 208 is a region where the LKAS 16 is able to recognize both the lane marks 202*l* and 202*r*. A second region 210 is a region where the LKAS 16 is unable to recognize the lane marks 202 (in particular, the left-side lane mark 202*l*) due to a large curvature of the lane marks 202. Although the first and second regions 208 and 210 are highlighted for the sake of easy understanding in FIG. 2, they are made of the same material as the straight road 204.

As described above, in this embodiment, base assist control, LKAS control, and rotation assist control are performed. Base assist control is to assist a driver in steering by using the base assist torque Tb. The base assist torque Tb amplifies the steering torque Tstr.

LKAS control is to control the EPS motor 28 so that the vehicle 10 can keep driving in the drive lane 200. More specifically, the EPS motor 28 is controlled so that a reference position Prefv of the vehicle 10 (also called "vehicle reference position Prefv") will coincide with a reference position Prefl of the drive lane 200 (also called "lane reference position Prefl"). The vehicle reference position Prefv is set to be the center of the vehicle 10 in the width direction of the vehicle 10, for example. The lane reference position Prefl is set to be the center of the drive lane 200 in the width direction of the vehicle 10, for example.

LKAS control is performed in the straight road 204 and the first region 208 of the curve road 206, for example. The LKAS torque Tlkas is used in LKAS control. The LKAS torque decreases a deviation of the vehicle reference position Prefv from the lane reference position Prefl.

Rotation assist control is to assist the vehicle 10 in turning along the curve road 206. Rotation assist control is performed in the second region 210 of the curve road 206, for example. In other words, in this embodiment, when the vehicle 10 enters the second region 210 along the curve of the curve road 206 and becomes unable to recognize the lane marks 202 (in particular, the left-side lane mark 202*l*), LKAS control is switched to rotation assist control. In rotation assist control, the rotation assist torque Tra is used for assisting the vehicle 10 in turning in the curve road 206.

[A-2-2. Switching Among Base Assist Control, LKAS Control, and Rotation Assist Control]
(A-2-2-1. Overview)

Figure 3:
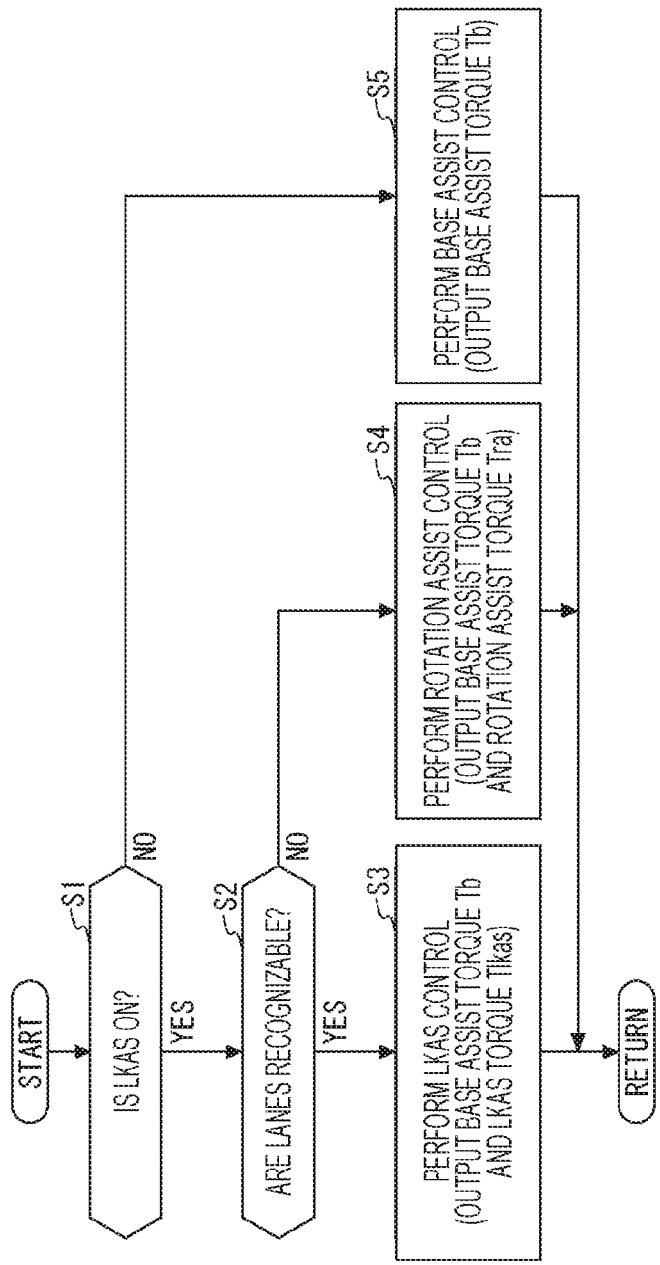
FIG. 3 is a flowchart illustrating switching processing for switching among base assist control, lane keep assist system (LKAS) control, and rotation assist control in the vehicle in the embodiment.

FIG. 3 is a flowchart illustrating switching processing for switching among base assist control, LKAS control, and rotation assist control in the vehicle 10. This switching processing will be described as the operation of the entire vehicle 10 rather than as processing by a specific element such as the ECU 38. If the LKAS 16 is ON (operating) (YES in step S1) and if the ECU 38 is able to recognize the lane marks 202*l* and 202*r* (YES in step S2), the vehicle 10 performs LKAS control in step S3. In this case, the EPS motor 28 outputs the base assist torque Tb and the LKAS torque TLkas.

If the ECU 38 is unable to recognize the lane marks 202*l* and 202*r* (NO in step S2), the vehicle 10 stops LKAS control and performs rotation assist control in step S4. In this case, the EPS motor 28 outputs the base assist torque Tb and the rotation assist torque Tra. When switching from LKAS control to rotation assist control, limitations are imposed on a change in the steering assist torque Tasi, though it is not shown in FIG. 3. This will be discussed in detail later.

If the LKAS 16 is OFF (not operating) (NO in step S1), the vehicle 10 performs base assist control in step S5. In this case, the EPS motor 28 outputs only the base assist torque Tb.

The vehicle 10 repeats switching processing shown in FIG. 3 at predetermined intervals. If the ECU 38 is unable to recognize the lane marks 202*l* and 202*r* (NO in step S2), the vehicle 10 performs rotation assist control in step S4. Thereafter, however, if the ECU 38 is found to be able to recognize the lane marks 202*l* and 202*r* (YES in step S2), the vehicle 10 returns to LKAS control. Alternatively, after the ECU 38 is found to be unable to recognize the lane marks 202*l* and 202*r* (NO in step S2), the LKAS switch 142 may be turned OFF, and the vehicle 10 may not return to LKAS control until the LKAS switch 142 is turned ON again.

(A-2-2-2. Examples of Various Types of Torque)

Figure 4:
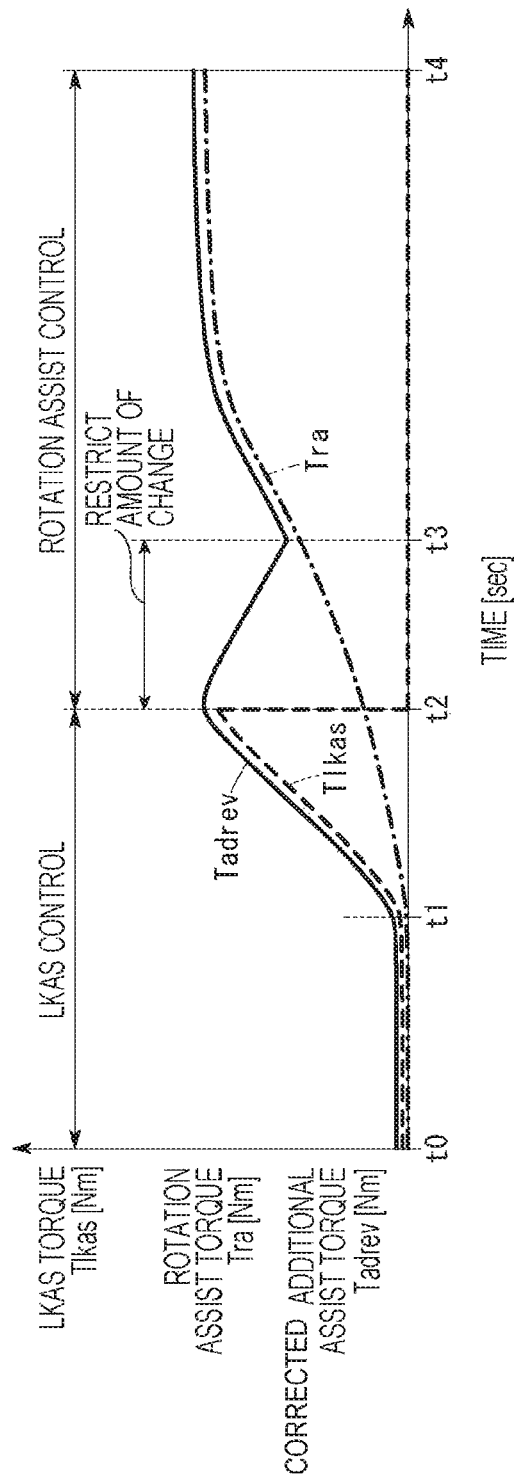
FIG. 4 is a graph illustrating examples of various types of torque in the embodiment.

FIG. 4 illustrates examples of various types of torque in this embodiment. In FIG. 4, the dashed line indicates LKAS torque Tlkas, the long dashed dotted line indicates rotation assist torque Tra, and the solid line indicates corrected additional assist torque Tadrev obtained by correcting additional assist torque Tad. The additional assist torque Tad is included in the steering assist torque Tasi (target torque) of the EPS motor 28. Details of the additional assist torque Tad will be discussed later with reference to FIG. 5. In FIG. 4, the base assist torque Tb is not shown for the sake of easy understanding.

From time point t0 to t2, the LKAS 16 is able to recognize the lane marks 202*l* and 202*r*. From time point t0 to t1, the reference position Prefv of the vehicle 10 coincides with the reference position Prefl of the drive lane 200. Consequently, the LKAS torque Tlkas is zero. At time point t1, the vehicle reference position Prefv deviates from the lane reference position Prefl, and thus, the LKAS torque Tlkas starts to increase. The additional assist torque Tad (corrected additional assist torque Tadrev) also increases accordingly.

From time point t2 to t4, the LKAS 16 is unable to recognize the lane marks 202*l* and 202*r*. Thus, from time point t2 to t3, the LKAS torque Tlkas is switched to the rotation assist torque Tra. In this case, to prevent sudden switching of the torque, the amount by which the additional assist torque Tad varies per unit time is restricted. From time point t3 to t4, the additional assist torque Tad (and corrected additional assist torque Tadrev) coincides with the rotation assist torque Tra.

The steering assist torque Tasi of the EPS motor 28 is a value obtained by adding the base assist torque Tb to the corrected additional assist torque Tadrev.

(A-2-2-3. Functional Configuration of Processor 112)
(A-2-2-3-1. Overview)

Figure 5:
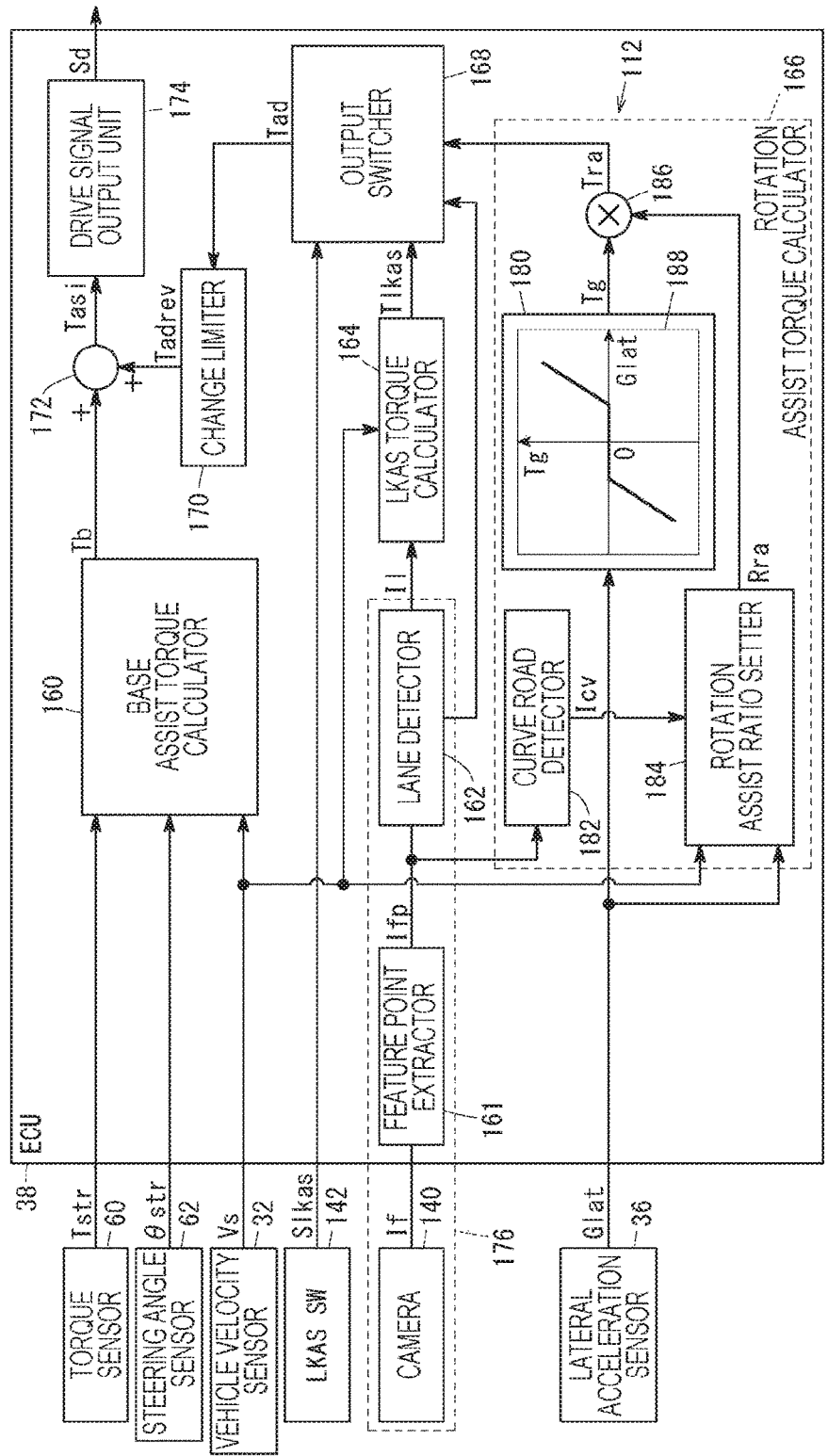
FIG. 5 is a block diagram illustrating the functional configuration of a processor of the ECU in the embodiment.

FIG. 5 illustrates the functional configuration of the processor 112 of the ECU 38. As shown in FIG. 5, the ECU 38 includes a base assist torque calculator 160, a lane mark feature point extractor 161, a lane detector 162, a LKAS torque calculator 164, a rotation assist torque calculator 166, an output switcher 168, a change limiter 170, an adder 172, and a drive signal output unit 174.

The processor 112 implements these elements as a result of executing a program stored in the storage unit 114. However, some functions of these elements may be implemented by hardware (such as an electric circuit).

(A-2-2-3-2. Base Assist Torque Calculator 160)

The base assist torque calculator 160 (hereinafter also called "calculator 160") calculates the base assist torque Tb, based on the steering torque Tstr from the torque sensor 60, the steering angle θstr from the steering angle sensor 62, and the vehicle velocity Vs from the vehicle velocity sensor 32. In this embodiment, a map in which the base assist torque Tb is associated with a combination of the steering torque Tstr, the steering angle velocity Vstr, and the vehicle velocity Vs is stored in the storage unit 114. The calculator 160 first calculates the steering angle velocity Vstr [deg/s] based on the steering angle θstr [deg], and then specifies the base assist torque Tb in association with a combination of the steering torque Tstr, the steering angle velocity Vstr, and the vehicle velocity Vs.

(A-2-2-3-3. Lane Mark Feature Point Extractor 161)

The lane mark feature point extractor 161 (hereinafter also called "feature point extractor 161") extracts feature points Pf of the lane marks 202*l* and 202*r* from the front image If. The feature point extractor 161 then outputs feature point information Ifp indicating the extracted feature points Pf to the lane detector 162 and the rotation assist torque calculator 166.

(A-2-2-3-4. Lane Detector 162)

The lane detector 162 detects the drive lane 200 based on the feature point information Ifp from the feature point extractor 161. The lane detector 162 then outputs lane information Il indicating the position and configuration of the lane 200 used for LKAS control to the LKAS torque calculator 164. The lane mark feature point extractor 161, the lane detector 162, and the camera 140 form a lane detecting device 176 (drive lane detector).

(A-2-2-3-5. LKAS Torque Calculator 164)

The LKAS torque calculator 164 (also called "calculator 164") calculates LKAS torque Tlkas based on the lane information I1 from the lane detector 162 and the vehicle velocity Vs from the vehicle velocity sensor 32.

Calculation of the LKAS torque Tlkas will be discussed more specifically. The calculator 164 sets the lane reference position Prefl in the width direction of the vehicle 10. The calculator 164 then calculates a deviation of the vehicle reference position Prefv from the lane reference position Prefl. The calculator 164 then sets the LKAS torque Tlkas so that the vehicle reference position Prefv will coincide with the lane reference position Prefl. In this case, to avoid a sudden motion of the vehicle 10, as the vehicle velocity Vs is higher, the calculator 164 sets a smaller amount of change ΔTlkas in the LKAS torque Tlkas per unit time (hereinafter called "LKAS torque change rate ΔTlkas). If the calculator 164 fails to set the lane reference position Prefl in the width direction of the vehicle 10 from the lane information I1, it sets the LKAS torque Tlkas to be zero.

(A-2-2-3-6. Rotation Assist Torque Calculator 166)

The rotation assist torque calculator 166 (hereinafter also called "calculator 166") calculates rotation assist torque Tra, based on the lateral acceleration Glat from the lateral acceleration sensor 36, the feature point information Ifp from the feature point extractor 161, and the vehicle velocity Vs from the vehicle velocity sensor 32. As shown in FIG. 5, the calculator 166 includes a lateral-acceleration torque calculator 180, a curve road detector 182, a rotation assist ratio setter 184, and a multiplier 186.

The lateral-acceleration torque calculator 180 (hereinafter also called "calculator 180") calculates the lateral acceleration torque Tg corresponding to the lateral acceleration Glat from the lateral acceleration sensor 36. In this embodiment, a map 188 in which the lateral acceleration Glat and the lateral acceleration torque Tg are associated with each other is stored in the storage unit 114.

The map 188 indicates that, as the absolute value of the lateral acceleration Glat increases, the absolute value of the lateral acceleration torque Tg also increases, except in a dead zone around the origin. Alternatively, as long as the absolute value of the lateral acceleration torque Tg partially increases in proportion to an increase in the absolute value of the lateral acceleration Glat, the lateral acceleration Glat and the lateral acceleration torque Tg may be associated with each other in a different manner. For example, the map 188 without a dead zone may be used.

The curve road detector 182 detects the curve road 206 (FIG. 2) in the drive lane 200, based on the feature point information Ifp from the feature point extractor 161. The precision demanded for detecting the curve road 206 is lower than that for detecting the lane 200 (or the reference position Prefl thereof) by the lane detector 162. Thus, while the lane detector 162 fails to detect the lane 200 (or the reference position Prefl thereof), the curve road detector 182 may succeed in detecting the curve road 206. The curve road detector 182 supplies curve road information Icv to the rotation assist ratio setter 184 as a result of detecting the curve road 206.

The rotation assist ratio setter 184 (hereinafter also called "setter 184") calculates the rotation assist ratio Rra (hereinafter also called "ratio Rra"), based on the lateral acceleration Glat from the lateral acceleration sensor 36, the vehicle velocity Vs from the vehicle velocity sensor 32, and the curve road information Icv from the curve road detector 182. The ratio Rra is a variable by which the lateral acceleration torque Tg is multiplied. The ratio Rf can take 0 to 1 in this embodiment.

When the vehicle 10 is driving in the straight road 204 (except for an area right before the curve road 206), the setter 184 sets the ratio Rra to be 0. When the vehicle 10 is driving in the curve road 206, the setter 184 sets the ratio Rra to be 1. In an area right before the curve road 206 (in other words, when the time allowance degree or the distance allowance degree representing an allowance before the vehicle 10 reaches the start point of the curve road 206 becomes lower than a predetermined value), the setter 184 gradually increases the ratio Rra from 0 to 1 so that the vehicle 10 can be ready for entering the curve road 206.

The setter 184 makes a determination as to whether the vehicle 10 is positioned right before the curve road 206, based on the estimated travel time taken for the vehicle 10 to reach the reference point of the curve road 206. The estimated travel time is calculated based on the vehicle velocity Vs and the distance to the reference point of the curve road 206.

The multiplier 186 multiplies the lateral acceleration torque Tg from the calculator 180 by the ratio Rra from the setter 184, and outputs the resulting value to the output switcher 168 as the rotation assist torque Tra.

(A-2-2-3-7. Output Switcher 168)

The output switcher 168 selects one of the LKAS torque Tlkas from the LKAS torque calculator 164 and the rotation assist torque Tra from the rotation assist torque calculator 166, and outputs the selected torque as the additional assist torque Tad.

This will be discussed more specifically. If the LKAS switch 142 is OFF, the output switcher 168 selects neither of the LKAS torque Tlkas nor the rotation assist torque Tra. Instead, the output switcher 168 sets the additional assist torque Tad to be 0 and outputs it to the change limiter 170. If the LKAS switch 142 is ON and if the lane detector 162 successfully detects the drive lane 200, the output switcher 168 selects the LKAS torque Tlkas and outputs it to the change limiter 170. In this case, the rotation assist torque Tra is not included in the additional assist torque Tad. If the LKAS switch 142 is ON and if the lane detector 162 fails to detect the drive lane 200, the output switcher 168 selects the rotation assist torque Tra and outputs it to the change limiter 170.

(A-2-2-3-8. Change Limiter 170)

The change limiter 170 limits the amount of change ΔTad in the additional assist torque Tad per unit time (hereinafter called "additional assist torque change rate ΔTad or "change rate ΔTad") and reflects the resulting change rate ΔTad in the additional assist torque Tad so as to calculate corrected additional assist torque Tadrev. The change limiter 170 then outputs the corrected additional assist torque Tadrev to the adder 172. The change limiter 170 sets a smaller change rate ΔTad as the lateral acceleration Glat is greater.

(A-2-2-3-9. Adder 172)

The adder 172 adds the base assist torque Tb from the base assist torque calculator 160 and the corrected additional assist torque Tadrev from the change limiter 170 so as to calculate the steering assist torque Tasi (target value).

(A-2-2-3-10. Drive Signal Output Unit 174)

The drive signal output unit 174 (hereinafter also called "output unit 174") calculates the target motor current Imtar corresponding to the steering assist torque Tasi. The output unit 174 then outputs a drive signal Sd to the switching elements of the inverter 30 so that the motor current Im from the current sensor 34 will coincide with the target motor current Imtar.

(A-2-2-4. Operation Example of LKAS Torque Calculator 164 and Rotation Assist Torque Calculator 166)

An operation example of the LKAS torque calculator 164 and the rotation assist torque calculator 166 will be described below in relation to the time points shown in FIG. 4. As discussed above, the base assist torque Tb calculated by the base assist torque calculator 160 is not shown in FIG. 4.

From time point t0 to t2 in FIG. 4, the lane detector 162 recognizes the lane marks 202*l* and 202*r*. From time point t0 to t1, the vehicle reference position Prefv coincides with the lane reference position Prefl. The LKAS torque calculator 164 thus outputs zero as the LKAS torque Tlkas. From time point t0 to t1, the vehicle 10 is driving in the straight road 204, and the rotation assist torque Tra is also zero. Consequently, the output switcher 168 does not include the rotation assist torque Tra in the additional assist torque Tad.

At time point t1, the vehicle reference position Prefv deviates from the lane reference position Prefl as the vehicle 10 is approaching the curve road 206. The LKAS torque calculator 164 increases the LKAS torque Tlkas in accordance with a deviation of the vehicle reference position Prefv from the lane reference position Prefl. At this time, the LKAS torque Tlkas is not zero, but a normal value. Consequently, the output switcher 168 still does not include the rotation assist torque Tra in the additional assist torque Tad. The change limiter 170 limits the additional assist torque change rate ΔTad and outputs the resulting corrected additional assist torque Tadrev to the adder 172. However, the change rate ΔTad from time point t1 to t2 is not limited by the change limiter 170. The steering assist torque Tasi thus increases in accordance with an increase in the additional assist torque Tad.

From time point t2 to t4, the lane detector 162 is unable to recognize the lane marks 202*l* and 202*r*. During this period, the LKAS torque Tlkas is reduced to zero, and the rotation assist torque Tra takes a value other than zero since the vehicle 10 is driving in the curve road 206. The lane detector 162 is unable to recognize the drive lane 200, and the output switcher 168 outputs the rotation assist torque Tra to the change limiter 170 as the additional assist torque Tad. The change limiter 170 receives the additional assist torque Tad that has suddenly dropped, and thus limits the additional assist torque change rate ΔTad. From time point t2 to t3, the additional assist torque Tad decreases more gently than the LKAS torque Tlkas.

At time point t3, the additional assist torque Tad coincides with the rotation assist torque Tra. From time point t3 to t4, the change limiter 170 outputs the rotation assist torque Tra as the corrected additional assist torque Tadrev.

(A-2-2-5. Further Description Rotation Assist Torque Tra)

Figure 6:
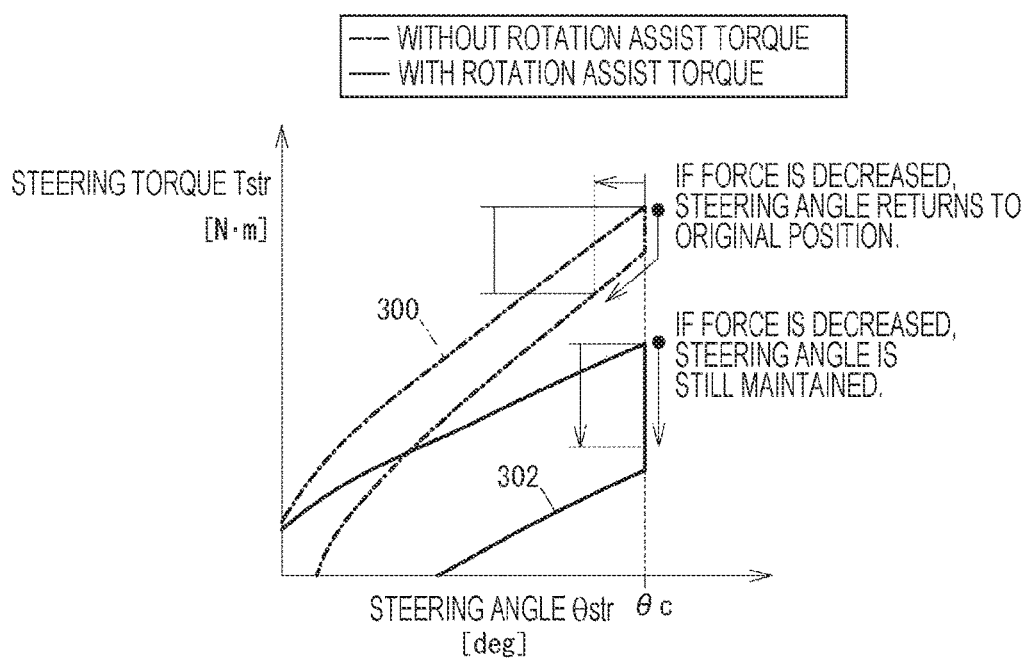
FIG. 6 is a graph for explaining rotation assist torque in the embodiment.

FIG. 6 is a graph for explaining the rotation assist torque Tra in this embodiment. The horizontal axis indicates the steering angle θstr, and the vertical axis indicates the steering torque Tstr of the driver. A long dashed dotted line 300 indicates an example of the relationship between the steering angle θstr and the steering torque Tstr without the rotation assist torque Tra. A solid line 302 indicates an example of the relationship between the steering angle θstr and the steering torque Tstr with the rotation assist torque Tra. The relationships between the steering angle θstr and the steering torque Tstr indicated by the long dashed dotted line 300 and the solid line 302 change clockwise. θc is a steering angle θstr when the driver stops operating the steering wheel 20 and will be also called "stoppage steering angle θc".

As described above, the rotation assist torque Tra is set in accordance with the lateral acceleration Glat (see the map 188 in FIG. 5). Thus, the rotation assist torque Tra acts so that the steering angle θstr (that is, the stoppage steering angle θc) can be maintained.

The lateral acceleration Glat varies according to the velocity Vs of the vehicle 10 and the radius of curvature of the curve road 206. As the lateral acceleration Glat is greater, a stronger steering torque Tstr is required for the driver to turn the curve road 206. The generation of the lateral acceleration Glat applies self-aligning torque to the front wheels 96 of the vehicle 10. At this time, if the driver releases the steering effort for the steering wheel 20, the steering angle θstr returns to the original position. The vehicle 10 is thus shifted toward the outward of the steering direction.

Without the rotation assist torque Tra (long dashed dotted line 300), as the steering angle θstr increases from the left side to the right side in FIG. 6, the burden of the steering on the driver can reasonably be reduced as a result of generating the base assist torque Tb. Although the driver is assisted in rotating in the curve road 206, the driver still requires a stronger steering torque Tstr (rotation force) as the steering angle θstr of the steering wheel 20 becomes greater.

Without the rotation assist torque Tra, when the driver decreases the steering torque Tstr from the state in which the steering effort is maintained, the steering angle θstr is maintained at the stoppage steering angle θc for a short time and then sharply drops from the right side to the left side in FIG. 6.

With the rotation assist torque Tra (solid line 302), as the steering angle θstr increases from the left side to the right side in FIG. 6, as well as the base assist torque Tb, the rotation assist torque Tra is also generated (see FIG. 5). The additional assist torque Tad thus becomes greater than that without the rotation assist torque Tra (long dashed dotted line 300). This enables the driver to operate the steering wheel 20 with a relatively small steering torque Tstr when rotating in the curve road 206.

When the driver decreases the steering torque Tstr from the state in which the steering effort is maintained, the rotation assist torque Tra corresponding to the lateral acceleration Glat does not immediately decrease. The steering angle θstr is thus maintained at the stoppage steering angle θc for a long time and then gradually decreases from the right side to the left side in FIG. 6.

In this manner, the use of the rotation assist torque Tra enables the driver to smoothly operate the steering wheel 20 when driving in a sharp curve road 206.

A-3. Advantages of Embodiment

As described above, in this embodiment, if LKAS control (drive assist control to assist a vehicle in keeping driving in the drive lane 200) is discontinued, the rotation assist controller 134 (curve road steering assist unit) (FIG. 2) performs steering assist for assisting the vehicle in turning along the curve of the curve road 206 (step S4 in FIG. 3, FIGS. 4 and 5). Even after LKAS control is discontinued, the steering angle θstr suitable for driving in the curve road 206 is likely to be maintained, thereby improving the drive assist performance in the curve road 206. Hence, steering assist (rotation assist control) for assisting the vehicle 10 in turning along the curve road 206 can be performed in combination with LKAS control.

In this embodiment, the lane detecting device 176 (drive lane detector) (FIG. 5) includes a camera 140 (imaging unit)

that obtains a front image If indicating a front area of the vehicle 10 and a lane detector 162 that detects the drive lane 200 from the front image If. The LKAS controller 132 (drive assist unit) (FIG. 2) includes a LKAS torque calculator 164 (lane keep assist unit) (FIG. 5). The LKAS torque calculator 164 calculates LKAS torque Tlkas (first steering assist amount) for assisting the vehicle 10 in keeping driving in the drive lane 200 detected by the lane detector 162 so as to perform LKAS control as steering assist based on the LKAS torque Tlkas. The rotation assist controller 134 (curve road steering assist unit) (FIG. 2) calculates rotation assist torque Tra (second steering assist amount) which increases in accordance with an increase in the lateral acceleration Glat of the vehicle 10 so as to perform steering assist based on the rotation assist torque Tra (FIG. 3). The ECU 38 (vehicle drive control device) includes a change limiter 170 (decrease limiter) (FIG. 5). When the lane detector 162 becomes unable to detect the drive lane 200 to a degree enough to perform LKAS control by the LKAS controller 132 (time point t2 in FIG. 4), the change limiter 170 limits a decrease in the corrected additional assist torque (corrected steering assist amount) Tadrev based on LKAS torque Tlkas until the corrected additional assist torque Tadrev coincides with the rotation assist torque Tra.

When the vehicle 10 enters the curve road 206, the lane detector 162 may not be able to detect the drive lane 200 to a degree enough to perform LKAS control by the LKAS controller 132. In this case, LKAS control is discontinued and is switched to rotation assist control. To avoid sudden switching from LKAS control to rotation assist control, instead of immediately setting the corrected additional assist torque Tadrev to zero, a decrease in the corrected additional assist torque Tadrev is limited until the corrected additional assist torque Tadrev coincides with the rotation assist torque Tra. Additionally, when switching to steering assist based on the lateral acceleration Glat, the corrected additional assist torque Tadrev is not suddenly changed. This allows the driver to feel less uncomfortable in response to steering assist.

As described above, when the lane detector 162 is unable to detect the drive lane 200 to a degree enough to perform LKAS control by the LKAS controller 132, a decrease in the corrected additional assist torque Tadrev (corrected steering assist amount) is limited. In this case, the change limiter 170 (decrease limiter) reduces a decrease in the corrected additional assist torque Tadrev per unit time to be smaller as the lateral acceleration Glat is greater.

Before the lane detector 162 becomes unable to detect the drive lane 200 to a degree enough to perform LKAS control by the LKAS controller 132 from the front image If due to the curving of a curve road 206, it is highly likely that the lane detector 162 has been able to detect the drive lane 200 from the front image If (the vehicle 10 has been driving in a gentler curve road 206). In other words, it is highly likely that the vehicle 10 is driving in a curve road 206 when the corrected additional assist torque Tadrev is gradually decreased as a result of the lane detector 162 failing to detect the drive lane 200 from the front image If. In this case, if the lateral acceleration Glat is greater, a decrease in the corrected additional assist torque Tadrev per unit time is set to be smaller. As a result, the drive assist performance in a sharp curve road 206 is more likely to be maintained.

B. Modified Examples

The present disclosure is not restricted to the above-described embodiment, and various modifications may be made based on the description of the embodiment. For example, the following configurations may be employed.

B-1. Subject to be Mounted on Vehicle

In the above-described embodiment, the steering device 12 is mounted on the vehicle 10 (FIG. 1). In terms of assisting steering of the steering wheel 20, however, the subject to be mounted on the vehicle 10 is not restricted to the steering device 12. The present disclosure may be applicable to a mobile body or a movable device including the steering wheel 20 (or an operator).

B-2. EPS Device 14

[B-2-1. Overall Configuration of EPS Device 14]

The EPS device 14 in the above-described embodiment is a column assist EPS device in which the EPS motor 28 transmits motor torque Tm to the steering shaft 52. However, any type of EPS device 14 that generates motor torque Tm may be used. The EPS device 14 may be a pinion assist, dual pinion assist, rack assist, or electro-hydraulic power steering device. In the electro-hydraulic power steering device, hydraulic pressure is created by an electric pump to generate motor torque Tm.

In the above-described embodiment, the direct transmit system is employed in which steering torque generated by the driver is directly transmitted to the front wheels 96. The present disclosure may be applicable to a steer-by-wire EPS device.

[B-2-2. EPS Motor 28]

In the above-described embodiment, the EPS motor 28 is a three-phase AC brushless motor. The EPS motor 28 may be another type of motor, such as a three-phase AC brush, single-phase AC, or DC motor.

In the above-described embodiment, the EPS motor 28 receives power from the low voltage battery 40 (FIG. 1). In addition to or instead of the low voltage battery 40, an alternator, a fuel cell, or a high voltage battery may supply power to the EPS motor 28.

[B-2-3. ECU 38]

The above-described embodiment has been discussed, assuming that the ECU 38 is mounted on the vehicle 10 (FIG. 1). However, part of the ECU 38 may be disposed in a mobile terminal, and this mobile terminal may be connected to a network of the vehicle 10.

In the above-described embodiment, the single ECU 38 controls both of the EPS device 14 and the LKAS 16 (FIGS. 1 and 3). However, different ECUs 38 may be provided to control the EPS device 14 and the LKAS 16 separately.

B-3. LKAS 16

[B-3-1. Lane Detecting Device 176 (Drive Lane Detector)]

In the above-described embodiment, as the drive lane detector for detecting the drive lane 200, the lane detecting device 176 including the camera 140, the feature point extractor 161, and the lane detector 162 is used (FIG. 5). However, map information may be used for detecting the drive lane 200, which will be discussed later.

In the above-described embodiment, the lane detector 162 detects the drive lane 200 (FIG. 2) defined by the lane marks 202l and 202r, which are white lines. Alternatively, the lane detector 162 may detect other types of lane marks 202 from which the drive lane 200 can be specified. For example, if, instead of white lines, traffic barriers (not shown) are disposed on the sides of the drive lane 200, the lane detector 162 may detect the traffic barriers or the positions inward from the traffic barriers by a predetermined distance as imaginary lane marks 202.

[B-3-2. Drive Assist Unit]

In the above-described embodiment, the LKAS controller 132 of the ECU 38 (FIG. 1) serves as the drive assist unit that performs drive assist control for assisting the vehicle 10 in keeping driving in the drive lane 200. In terms of performing drive assisting, however, the drive assist unit is not restricted to the LKAS controller 132. For example, the present disclosure may be applicable to a lane departure preventing device that prevents the departure of the vehicle 10 from the lane marks 202*l* and 202*r* without detecting a deviation of the vehicle reference position Prefv from the lane reference position Prefl.

B-4. Rotation Assist Control

[B-4-1. Rotation Assist Torque Tra (Steering Assist Torque Tasi)]

In rotation assist control in the above-described embodiment, as the steering assist torque Tasi, a drive force (torque) in the same direction as the steering torque Tstr of the driver is generated. In terms of assisting a driver in steering using the steering wheel 20, however, a force acting in the direction opposite to the steering torque Tstr (for example, a reaction force) may be generated.

"Assisting a driver in steering using the steering wheel 20" refers to the following two cases if the direct transmit system is employed in which the EPS device 14 directly transmits the steering torque Tstr to the front wheels 96. In one case, assisting a driver in steering using the steering wheel 20 makes it easy for the driver to rotate the steering wheel 20 in a direction intended by the driver (such as the configuration in the above-described embodiment). In the other case, assisting a driver in steering using the steering wheel 20 makes it difficult for the driver to rotate the steering wheel 20 in a direction intended by the driver.

[B-4-2. Curve Road Information Icv]

In the above-described embodiment, the ECU 38 obtains the curve road information Icv based on the front image If (FIG. 5). However, the curve road information Icv may be obtained in a different manner. For example, the ECU 38 may obtain the curve road information Icv based on map information. If map information is used, a global positioning system (GPS) antenna for detecting the current position Pc of the vehicle 10 and a map information providing device are provided. The map information providing device includes a map database (DB) and provides the curve road information Icv based on the current position Pc to the ECU 38.

With the use of the curve road information Icv based on the map DB, if the lane detector 162 fails to detect the lane marks 202*l* and 202*r* of the curve road 206 from the front image If, a decrease in the LKAS torque (first steering assist amount) per unit time is reduced. It is thus more likely to continue steering assist in accordance with the curve road 206, thereby improving the drive assist performance in the curve road 206.

[B-4-3. Corrected Additional Assist Torque Tadrev]

In the above-described embodiment, when limiting a decrease in the LKAS torque Tlkas as a result of the lane detecting device 176 failing to detect the lane marks 202*l* and 202*r*, the change limiter 170 reduces a decrease in the corrected additional assist torque Tadrev (LKAS torque Tlkas) per unit time to be smaller as the lateral acceleration Glat is greater (time point t2 to t3 in FIG. 4). In terms of performing steering assist for assisting the vehicle 10 in turning along the curve road 206 when drive assist control by the LKAS controller 132 is discontinued, steering assist may be performed in a different manner. For example, a decrease in the corrected additional assist torque Tadrev (LKAS torque Tlkas) per unit time may be set to be constant regardless of the lateral acceleration Glat.

In the above-described embodiment, for switching from LKAS torque Tlkas to rotation assist torque Tra, a decrease in the additional assist torque Tad or a decrease in the corrected additional assist torque Tadrev is reduced (FIGS. 4 and 5). Alternatively, limitations may be imposed on a change in the LKAS torque Tlkas per unit time (ΔTlkas).

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle drive control device comprising:
a drive lane detector that detects a drive lane of a subject vehicle;
a drive assist electronic control unit (ECU) that performs drive assist control to assist the subject vehicle in lane-keeping in the drive lane; and
a curve road steering assist ECU that performs steering assist for assisting the subject vehicle in turning along a curve of a curve road when the drive lane is the curve road and when the drive assist control performed by the drive assist ECU is discontinued during driving on the curve road,
wherein
the drive lane detector includes
an imaging unit that obtains a front image indicating a front area ahead of the subject vehicle, and
a lane detector that detects the drive lane from the front image,
the drive assist ECU includes
a lane keep assist ECU that calculates a first steering assist amount for assisting the subject vehicle in the lane keeping in the drive lane detected by the lane detector so as to perform lane keep control as steering assist by using the first steering assist amount, and
the curve road steering assist ECU calculates a second steering assist amount which increases in accordance with an increase in a lateral acceleration of the subject vehicle so as to perform the steering assist by using the second steering assist amount,
the drive assist control performed by the drive assist ECU is discontinued when the lane detector becomes unable to detect the drive lane during driving on the curve road to a degree enough to perform the drive assist control by the drive assist ECU,
the vehicle drive control device further comprising:
a decrease limiter that limits a decrease in a corrected steering assist amount corrected by the first steering assist amount or a decrease in the first steering assist amount until the corrected steering assist amount or the first steering assist amount coincides with the second steering assist amount when the lane detector becomes unable to detect the drive lane to the degree enough to perform the drive assist control by the drive assist ECU.

2. The vehicle drive control device according to claim 1, wherein, when the decrease limiter limits the decrease in the corrected steering assist amount or the decrease in the first steering assist amount as a result of the lane detector becoming unable to detect the drive lane to the degree enough to perform the drive assist control by the drive assist ECU, the decrease limiter reduces the decrease in the corrected steering assist amount or the decrease in the first steering assist amount per unit time to be smaller decrease as the lateral acceleration is greater.

3. The vehicle drive control device according to claim 1, wherein the vehicle drive control device switches from the drive assist control performed by the drive assist ECU to the steering assist performed by the curve road steering assist ECU when the drive assist control performed by the drive assist ECU is discontinued during driving on the curve road.

4. A vehicle drive control method comprising steps of:
(i) detecting, by a computer, a drive lane of a subject vehicle;
(ii) performing, by the computer, a drive assist control to assist the subject vehicle in lane-keeping in the drive lane, and calculating a first steering assist amount for assisting the subject vehicle in the lane keeping in the drive lane so as to perform lane keep control as steering assist by using the first steering assist amount; and
(iii) performing, by the computer, a steering assist for assisting the subject vehicle in turning along a curve of a curve road when the drive lane is the curve road and when the drive assist control is discontinued during driving on the curve road, and calculating a second steering assist amount which increases in accordance with an increase in a lateral acceleration of the subject vehicle so as to perform the steering assist by using the second steering assist amount,
wherein the step (iii) comprises:
switching from the drive assist control to the steering assist when the drive assist control is discontinued during driving on the curve road, and
limiting a change in the steering assist amount when the first steering assist amount is switched to the second steering assist amount when switching from the drive assist control to the steering assist.

5. A vehicle drive control device comprising:
a drive lane detector that detects a drive lane of a subject vehicle;
a drive assist electronic control unit (ECU) that performs drive assist control to assist the subject vehicle in lane-keeping in the drive lane; and
a curve road steering assist ECU that performs steering assist for assisting the subject vehicle in turning along a curve of a curve road when the drive lane is the curve road and when the drive assist control performed by the drive assist ECU is discontinued during driving on the curve road, wherein the vehicle drive control device switches from the drive assist control performed by the drive assist ECU to the steering assist performed by the curve road steering assist ECU when the drive assist control performed by the drive assist ECU is discontinued during driving on the curve road,
wherein
the drive assist ECU includes
a lane keep assist ECU that calculates a first steering assist amount for assisting the subject vehicle in the lane keeping in the drive lane detected by the lane detector so as to perform lane keep control as steering assist by using the first steering assist amount, and
the curve road steering assist ECU calculates a second steering assist amount which increases in accordance with an increase in a lateral acceleration of the subject vehicle so as to perform the steering assist by using the second steering assist amount,
the vehicle drive control device further comprising:
a steering assist amount change limiter that limits a change in the steering assist amount when the first steering assist amount is switched to the second steering assist amount when the vehicle drive control device switches from the drive assist control performed by the drive assist ECU to the steering assist performed by the curve road steering assist ECU.

6. The vehicle drive control device according to claim 5, wherein
the drive lane detector includes
an imaging unit that obtains a front image indicating a front area ahead of the subject vehicle, and
a lane detector that detects the drive lane from the front image, and
the drive assist control performed by the drive assist ECU is discontinued when the lane detector becomes unable to detect the drive lane during driving on the curve road to a degree enough to perform the drive assist control by the drive assist ECU.

7. The vehicle drive control method according to claim 4, wherein
the step (i) detects the drive lane from a front image indicating a front area ahead of the subject vehicle, and
the drive assist control is discontinued when the drive lane becomes unable to be detected during driving on the curve road to a degree enough to perform the drive assist control.

* * * * *